United States Patent [19]

Shimomura

[11] Patent Number: 4,775,234
[45] Date of Patent: Oct. 4, 1988

[54] SPECTROSCOPIC MEASUREMENT SYSTEM

[75] Inventor: Teiichi Shimomura, Atsugi, Japan

[73] Assignee: Shimadzu Corporation, Kyoto, Japan

[21] Appl. No.: 945,546

[22] Filed: Dec. 23, 1986

[51] Int. Cl.$^4$ .............................................. G01J 3/28
[52] U.S. Cl. .................................. 356/328; 356/334; 250/339; 250/349; 250/350
[58] Field of Search ...................... 250/339, 349–351; 356/328, 334

[56] References Cited

U.S. PATENT DOCUMENTS

| | | | |
|---|---|---|---|
| Re. 31,815 | 1/1985 | Alfano | 356/318 |
| 3,031,576 | 4/1962 | Loy | 250/339 |
| 3,390,604 | 7/1968 | Makabe | 356/328 |
| 3,418,051 | 12/1968 | Staunton | 356/334 |
| 3,523,734 | 8/1970 | Brehm et al. | 356/328 |
| 3,781,558 | 12/1973 | Anderson | 250/339 |
| 3,923,399 | 12/1975 | Brumley | 356/328 |
| 3,994,586 | 11/1976 | Sharkins et al. | 250/339 |
| 4,006,358 | 2/1977 | Howarth | 250/339 |
| 4,253,765 | 3/1981 | Kato et al. | 356/328 |
| 4,519,707 | 5/1985 | Kuffer | 356/328 |
| 4,664,522 | 5/1987 | Le Febre | 356/328 |

FOREIGN PATENT DOCUMENTS

| | | | |
|---|---|---|---|
| 0049154 | 4/1979 | Japan | 356/328 |
| 0113384 | 9/1979 | Japan | 356/328 |

Primary Examiner—Craig E. Church
Assistant Examiner—John C. Freeman
Attorney, Agent, or Firm—Birch, Stewart, Kolasch, & Birch

[57] ABSTRACT

A spectroscopic measurement system comprises at least two kinds of diffraction gratings whose grating surfaces are in line, an exchange device for exchanging the positions of the two kinds of diffraction gratings in connection with incident light to be measured while the two kinds of diffraction gratings are placed in a predetermined rotation angle, at least two kinds of detectors having characteristics corresponding to those of the two kinds of diffraction gratings respectively, a light path switch for switching a path of diffraction light toward either of the two kinds of detectors, and a switch circuit for switching the detection output of the two kinds of detectors in synchronization with the exchange operation of the two kinds of diffraction gratings.

5 Claims, 4 Drawing Sheets

SPECTROSCOPIC MEASUREMENT SYSTEM

BACKGROUND OF THE INVENTION

The present invention relates to a spectroscopic measurement system that is suitable for a spectrum over a wide wavelength range and, more particularly, to an automatic and continuous spectroscopic measurement system for a spectrum over a wide wavelength range.

Due to the development of optical communication, demand for a spectroscopic measurement system over a wide wavelength range is has been increased to test the characteristics of various optical elements. To provide a spectroscopic measurement over a wide wavelength range, a plurality of diffraction gratings and detectors should be used owing to the limitation of the efficiency characteristics of the diffraction gratings and the wavelength sensitivity characteristics of the detectors. The diffraction gratings normally cannot provide good and uniform diffraction efficiency over the total region of a wide wavelength range. Instead, the diffraction efficiency is reduced at both sides of a specific frequency providing the peak values. Therefore, a wavelength range that is measured with a diffraction grating is limited by the diffraction efficiency characteristics of the diffraction grating. To perform a spectroscopic measurement over a wide wavelength range ($\lambda_1 \sim \lambda_3$), a first diffraction grating showing good efficiency at a shorter wavelength range ($\lambda_1 \sim \lambda_2$) and a second diffraction grating showing good efficiency at a longer wavelength range ($\lambda_2 \sim \lambda_3$) which is adjacent to the shorter wavelength range are needed.

This problem is similar with respect to the detectors. That is, two detectors are needed each showing good wavelength sensitivity at the relevant regions. A first detector showing good wavelength sensitivity at a shorter wavelength region ($\lambda_1 \sim \lambda_2$) and a second detector showing good wavelength sensitivity at a longer wavelength region ($\lambda_2 \sim \lambda_3$) adjacent to the shorter one should be provided.

The conventional spectroscopic measurement system is directed to the spectroscopic measurement at a relatively narrow wavelength region. The conventional system is as follows:

(A) A single diffraction grating and a single detector are used.
(B) Two diffraction gratings are selectively used while a single detector is commonly operated.
(C) A single diffraction grating and two detectors are provided where both detectors are manually switched.

Since the above systems are provided with a single diffraction grating or a single the measurement characteristics are is limited so that it is difficult to enable measurement over a wide wavelength region. Thus, the conventional systems cannot meet with the recent requirements of spectroscopic measurement over a wide wavelength region.

SUMMARY OF THE INVENTION

Accordingly, it is an object of the present invention to provide an improved spectroscopic measurement system suitable for measurement over a wide wavelength region.

It is another object of the present invention to provide an improved spectroscopic measurements system suitable for measurement over a wide wavelength region continuously and automatically.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, in accordance with the present invention, a spectroscopic measurement system comprises at least two kinds of diffraction gratings whose grating surfaces are in line, exchange means for exchanging the positions of the two kinds of diffraction gratings, preferably, by sliding the two kinds of diffraction gratings in connection with incident light to be measured in the longitudinal direction thereof while the two kinds of diffraction gratings are placed in a predetermined rotation angle, at least two kinds of detectors having characteristics corresponding to those of the two kinds of diffraction gratings, respectively, light path switch means for switching a path of diffraction light from the two kinds of diffraction gratings at high speed in order to alternatively forward the diffraction light to either of the two kinds of detectors, and switch means for switching the detection output of the two kinds of detectors in synchronization of the exchange operation of the two kinds of diffraction gratings.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
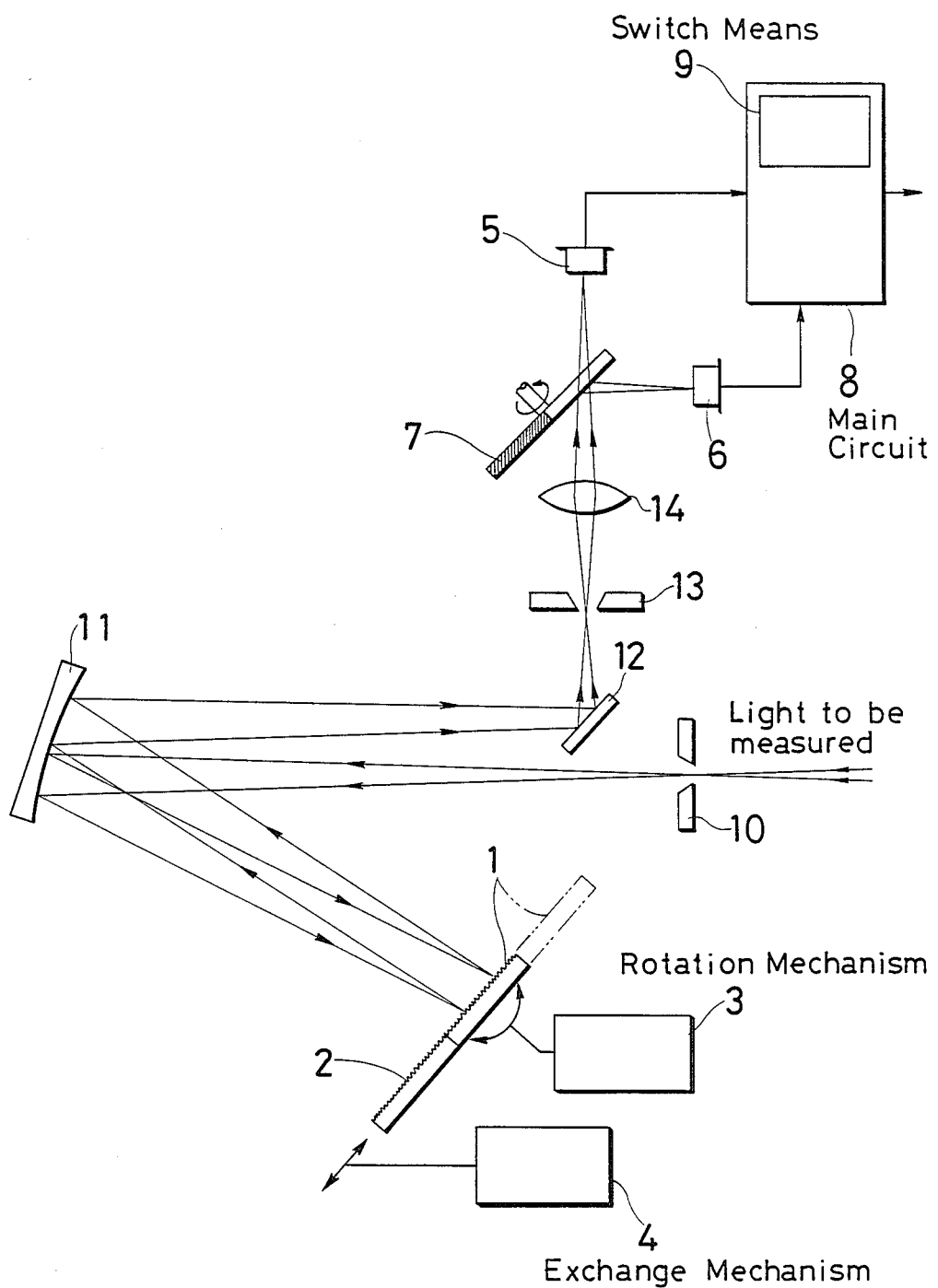
FIG. 1 is an arrangement of a spectroscopic measurement system according to the present invention.

FIG. 1 is an arrangement of a spectroscopic measurement system according to the present invention. The system comprises first and second diffraction gratings 1 and 2, a rotation mechanism 3 for rotating the first and second diffraction gratings 1 and 2, an exchange mechanism 4 for exchanging the positions of the gratings 1 and 2 to each other, first and second detectors 5 and 6, a light path switch means 7 for switching the light path to either of the first or second detectors 5 or 6, and a main circuit 8 for selectively outputting the detection output of the first and the second detectors 5 and 6. A switch means 9 is provided in the main circuit 8 for switching the detection output of the detectors 5 and 6.

Before the light path toward the first and the second diffraction gratings 1 and 2, an entrance slit 10 and a reflection mirror 11 having a spherical or paraboloid surface are positioned so that light to be measured is incident on either of the first or second diffraction gratings 1 and 2 via the entrance slit 10 and reflection mirror 11. The first and the second diffraction gratings 1 and 2 are supposed to provide good diffraction efficiency characteristics at the adjacent wavelength regions. That is, the first diffraction grating 1 shows good diffraction efficiency characteristics at a shorter wavelength region ($\lambda_1 \sim \lambda_2 + \Delta\lambda_3$) while the second diffraction grating 2 shows good diffraction efficiency characteristics at a longer wavelength region ($\lambda_2 - \Delta\lambda_2 \sim \lambda_3$) in part overlapping the shorter wavelength region. The diffraction surfaces of the first and the second diffraction gratings 1 and 2 are aligned. They may be individually prepared and then joined at the opposing edges. Otherwise, two kinds of diffraction surfaces may be formed on a single substrate. It is preferable that the first and the second diffraction gratings 1 and 2 always have the same grating constant, but have different specific frequencies providing the peak values.

The first and the second diffraction gratings 1 and 2 are rotated with the rotation mechanism 3 such as a sine-bar mechanism, at an appropriate position on which the light to be measured is incident. When these diffraction gratings 1 and 2 reach a predetermined rotation angle, the exchange mechanism 4 is operated so that they are slid in a longitudinal direction to themselves and perpendicular to their grating grooves. Therefore, the positions of the first and the second diffraction gratings are exchanged in connection with the incident light to be measured.

On the subsequent stage of the first and the second diffraction gratings 1 and 2, a tilt reflection mirror 12 and an exit slit 13 are provided. The diffraction light by the first and the second diffraction gratings 1 and 2 is reflected by the reflection mirror 11 first and by the tilt reflection mirror 12 second to finally be incident on either of the first or second detectors 5 or 6 through the outlet slit 13.

The first and a second detectors 5 and 6 have the wavelength sensitivity corresponding to the diffraction efficiency characteristics of the first and second diffraction gratings 1 and 2, respectively. That is, the first detector 5 has good wavelength sensitivity at the shorter wavelength region ($\lambda_1 \sim \lambda_2 + \Delta\lambda_3$) while the second detector 6 has good wavelength longer wavelength region ($\lambda_2 - \Delta\lambda_2 \sim \lambda_3$) in part overlapping the shorter wavelength region. At the former stage of the first and the second detectors 5 and 6, a lens 14 and a light path switching means 7 are provided. The diffraction light passing through the exit slit 13 is incident on either of the first or second detectors 5 or 6 via the lens 14 and the light path switching means 7. The light path switching means 7 comprises a rotative chopper having a mirror surface thereon. It is rotated at high speed, obliquely traversing the light path of the diffraction light. The diffraction light not being shut out by the light path switching means 7 is incident on the first detector 5 while the diffraction light whose light path is changed by the light path switching means 7 is incident on the second detector 6.

Figure 2:
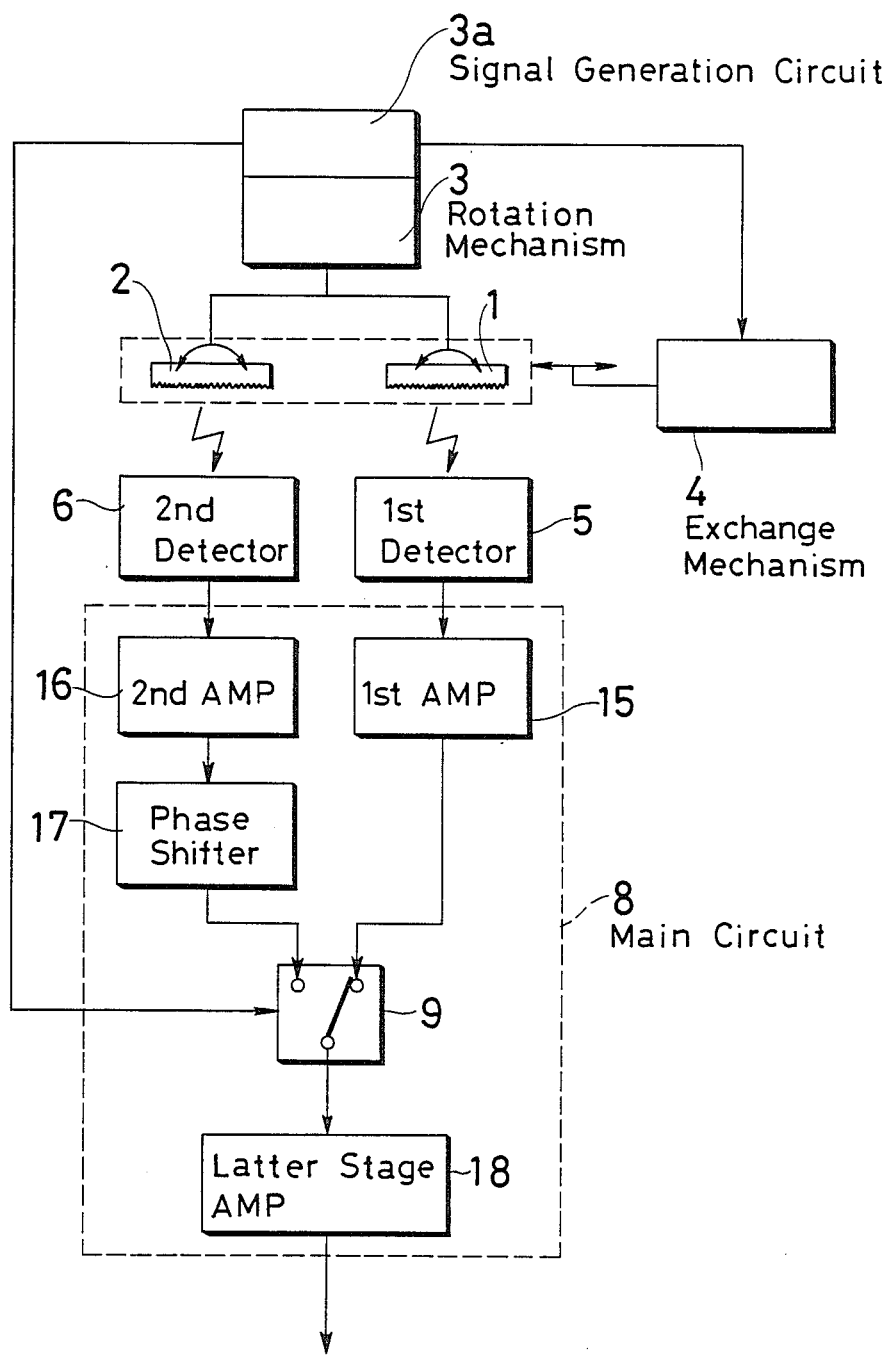
FIG. 2 is a block diagram of a main circuit in the spectroscopic measurement system of the present invention.

The main circuit 8 receives the detection output of the first and second detectors 5 and 6. FIG. 2 is a block diagram of the main circuit 8. The main circuit 8 comprises first and second amplifiers 15 and 16 for amplifying the detection output of the first and second detectors 5 and 6, respectively, a phase shifter 17 for shifting the phase of the detection output of either the first or second amplifiers 15 and 16 (in this embodiment the second amplifier 16 is preferred), the switch means 9 for receiving the output of the phase shifter 17 and the detection output of the first detector 15, and a latter stage amplifier 18 for amplifying the output of the switch means 9. The output of the latter stage amplifier 18 is synchronously rectified and then forwarded to a display for displaying spectra or a recording device. The phase shifter 17 acts to equalize the phases of the outputs of the first and second amplifiers 15 and 16. In synchronization with the exchange of the first and second diffraction gratings 1 and 2, the operation of the switch means 9 is switched. When the first diffraction grating 1 is positioned to receive the light to be measured, the switch means 9 outputs the output of the first detector 5. When the second diffraction grating 2 is positioned to receive the measurement light, the switch means 9 outputs the output of the second detector 6. The switching operation of the switch means 9 is controlled by a signal developed from a signal generation circuit 3a that is added to the rotation mechanism 3.

Figure 3:
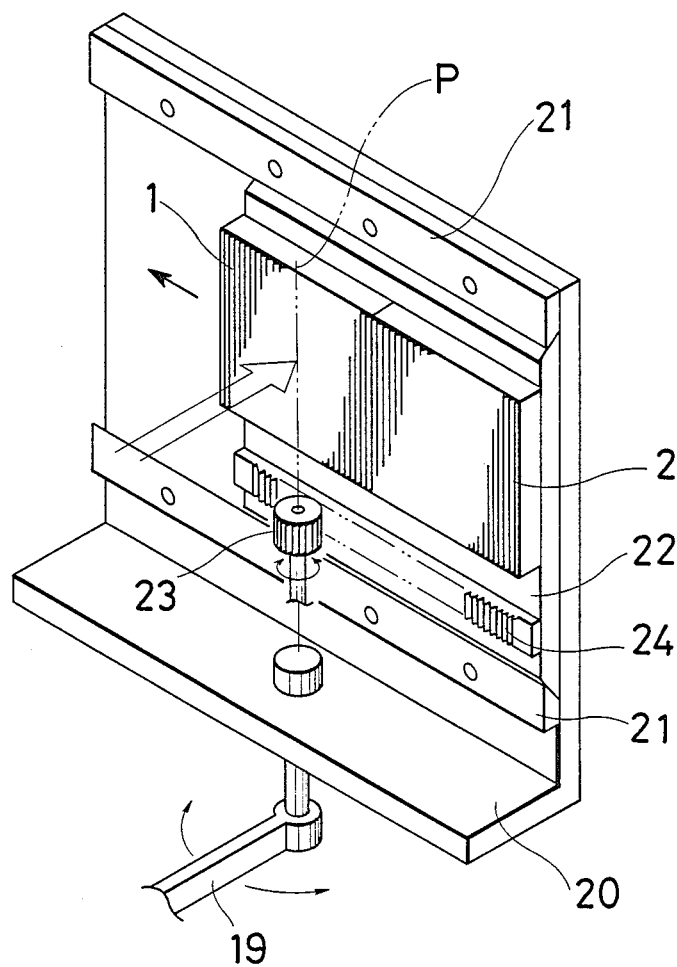
FIG. 3 is a perspective view of a support of a diffraction grating used for the present invention.
Figure 4:
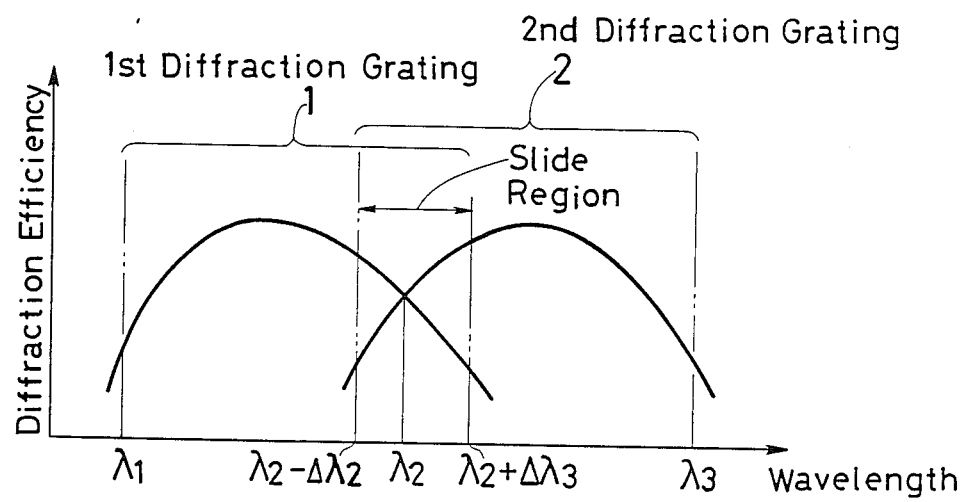
FIGS. 4(A) and 4(B) are graphs showing the wavelength characteristics of the diffraction gratings used for the present invention.
Figure 4:
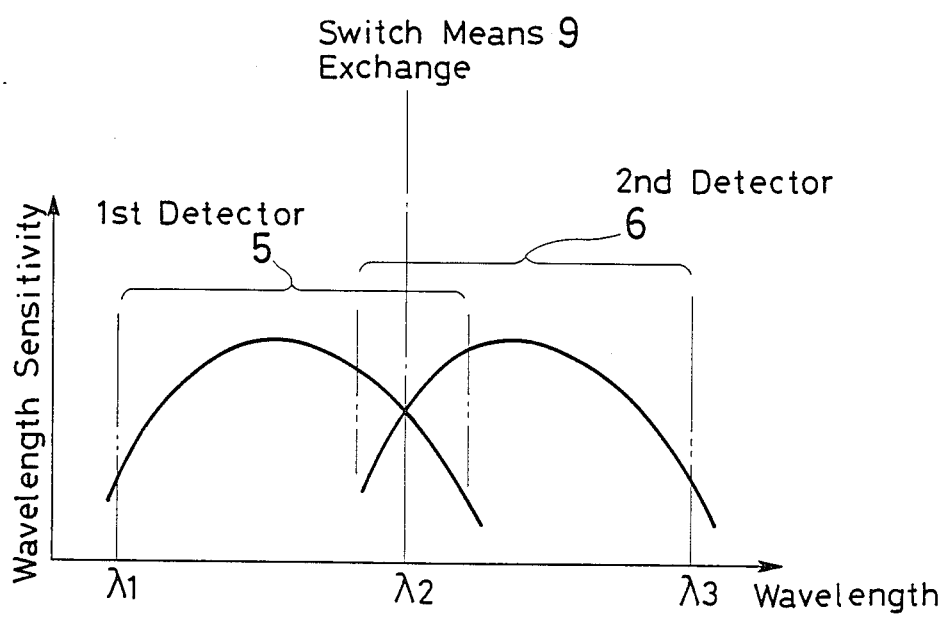

FIG. 3 is a perspective view of a supporter of the first and second diffraction gratings 1 and 2. The supporter comprises a frame 20 rotating around a rotation axis P in unison with a sine-bar 19, a slide base 22 attached to the front portion of the frame 20, the slide base 22 being slidable in the direction perpendicular to the rotation axis P with a pair of guides 21, and a rack 24 provided on the slide base 22 where the rack is engaged with a pinion 23. The first and the second diffraction gratings 1 and 2 are attached on the front portion of the slide base 22. The pinion 23 is provided on the rotation axis P that is rotated by the exchange mechanism 4. Therefore, without any damage of the rotation of the frame 20, the slide base 22 is slid so that the positions of the first and second diffraction gratings 1 and 2 are exchanged. With the support mechanism of the first and the diffraction gratings 1 and 2, the rotation of the gratings 1 and 2 at the position, where the light to be measured is incident, is independent of the slide shift of the diffraction gratings 1 and 2 along their length.

Using the above-described system, to start to perform the spectroscopic measurement at the shorter wavelength region ($\lambda_1 \sim \lambda_2$). the first diffraction grating 1 is moved to the position where the measurement light is incident and the switch means 9 in the main circuit 8 is connected to the first detector 5. Therefore, the measurement light is diffracted by the first diffraction grating 1 so that the diffraction light is incident on either of the first and the second detectors 5 and 6 through the light path switching means 7. The first and second detectors 5 and 6 generate photo-electric output. Since the switch means 9 at the subsequent stage is connected to the first detector 5, the detection output of the first detector 5 only is outputted from the control circuit 8. Therefore, in the shorter wavelength region, the measurement light is diffracted by the first diffraction grating 1 so that the diffracted light is detected by the first detector 5.

Under the circumstances, the first and second diffraction gratings 1 and 2 are rotated by the rotation mechanism 3 to the position where longer-wavelength diffracted light is emitted. When the rotation angle of the diffraction gratings 1 and 2 becomes a predetermined value corresponding to the wavelength value ($\lambda_2 - \Delta\lambda_2$), the exchange mechanism 4 is operated to slide the first and second diffraction gratings 1 and 2. When the rotation angle of the diffraction gratings 1 and 2 becomes another predetermined value corresponding to the wavelength value ($\lambda_2 + \Delta\lambda hd 3$), the positions of the first and second diffraction gratings 1 and 2 are completely exchanged, so that the second diffraction grating 2 is positioned to receive the incident light of the measurement light. Therefore, at the longer wavelength region, the second diffraction grating 2 is used to diffract the measurement light so that the diffracted light is incident on either of the first or second detectors 5 or 6.

When the rotation angles of the first and second diffraction gratings 1 and 2 reach one corresponding to the boundary ($\lambda_2$) between the shorter wavelength region and the longer wavelength region, a signal developed from the signal generation circuit 3a in the rotation mechanism 3 enables the switch means 9 to be switched to the second detector 6. The second detector 6 is used to provide a detection output so that the main circuit 8 provides this detection output in the longer wavelength region. Thus, at the longer wavelength region, the measurement light is diffracted by the second diffraction grating 2 so that the diffracted light is detected by the second diffraction grating 6.

As described above, in accordance with the present invention, in a shorter wavelength region, a first diffraction grating and a first detector showing good characteristics in this wavelength region are used to perform spectroscopic measurements. When the rotation angle of the first diffraction grating exceeds a predetermined angle, an exchange mechanism is operated to replace the first diffraction grating with a second one to correspond to the measurement light. A switch means is also switched so that the second diffraction grating and a second detector showing good characteristics in a longer wavelength region are used to perform spectroscopic measurement. Because the first diffraction grating and the first detector showing good characteristics in the shorter wavelength region, and the second diffraction grating and the second detector showing good characteristics in the longer wavelength region are selectively operated to perform spectroscopic measurement, precise and wide spectroscopic measurements can be enabled by a combination of a diffraction grating and a detector showing good characteristics.

Besides, the diffraction surfaces of the first and second diffraction gratings are continuous and the positions of the first and second diffraction gratings are exchanged by the slide of the first and second diffraction gratings in the longitudinal direction of their diffraction surfaces. After either diffraction grating is operated to diffract the measurement light, the other diffraction grating is continuously operated to diffract the measurement light. Measurement cannot be disturbed in the transition of the wavelength region. Continuous measurement over the whole wavelength region can be performed. No mispositionings due to the exchange of the diffraction gratings are caused to thereby perform precise spectroscopic measurement.

While only certain embodiments of the present invention have been described, it will be apparent to those skilled in the art that various changes and modifications may be made therein without departing from the spirit and the scope of the invention as claimed.

What is claimed is:

1. A spectroscopic measurement system comprising:
  light source means for generating incident light;
  at least two kinds of diffraction gratings with different efficiency characteristics whose grating surfaces are in line, and the diffraction efficiencies being good over different wavelength regions;
  exchange means for exchanging the positions of said diffraction gratings in connection with the incident light to be measured while said diffraction gratings are placed in a predetermined rotation angle;
  at least two kinds of detectors having different characteristics corresponding to those of said diffraction gratings, respectively;
  light path switch means for switching a path of diffraction light from said diffraction gratings at high speed in order to alternatively forward the diffraction light to either of said detectors; and
  switch means for switching the detection output of said detectors in synchronization with the exchange operation of said diffraction gratings.

2. The spectroscopic measurement system as set forth in claim 1, wherein said exchange means exchanges the positions of said diffraction gratings by sliding them in the longitudinal direction of said diffraction gratings.

3. The spectroscopic measurement system as set forth in claim 1, wherein said detectors have good wavelength sensitivity at the different wavelength regions, respectively, corresponding to the different wavelength regions affording good diffraction efficiency for said diffraction gratings.

4. The spectroscopic measurement system as set forth in claim 1, wherein said exchange means comprises rotation means for rotating said diffraction gratings, and position changing means for changing the positions of said diffraction gratings after a specific rotation angle of said diffraction gratings.

5. The spectroscopic measurement system as set forth in claim 1, further including signal generation means responsive to said exchange means for providing a signal for actuating said switch means.

* * * * *